US010753739B2

(12) United States Patent
Terashima et al.

(10) Patent No.: US 10,753,739 B2
(45) Date of Patent: Aug. 25, 2020

(54) STRUCTURE FOR APPLYING PRE-LOAD TO ROLLING BEARING AND THREE-DIMENSIONAL SURVEY DEVICE HAVING THE SAME

(71) Applicant: TOPCON CORPORATION, Itabashi-ku, Tokyo (JP)

(72) Inventors: Yasuo Terashima, Tokyo (JP); Yasushi Tanaka, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 202 days.

(21) Appl. No.: 16/100,682

(22) Filed: Aug. 10, 2018

(65) Prior Publication Data

US 2019/0063919 A1    Feb. 28, 2019

(30) Foreign Application Priority Data

Aug. 22, 2017 (JP) ................. 2017-159097

(51) Int. Cl.
*G01C 15/00* (2006.01)
*F16C 35/077* (2006.01)
*F16C 25/08* (2006.01)

(52) U.S. Cl.
CPC ............ *G01C 15/002* (2013.01); *F16C 25/08* (2013.01); *F16C 25/083* (2013.01);
(Continued)

(58) Field of Classification Search
CPC ........ G01C 15/002; G01C 3/08; G01C 15/06; G01C 11/025; G01C 11/06; G01C 15/006; G01C 1/02; G01C 15/00
(Continued)

(56) References Cited

U.S. PATENT DOCUMENTS 10,261,186 B2 *   4/2019  Ohnishi ................. G01S 17/86
2014/0111618 A1   4/2014  Kumagai et al.
(Continued)

FOREIGN PATENT DOCUMENTS

| CH | 215470 A    | 6/1941 |
| JP | S6161322 U  | 4/1986 |
| JP | 6120521 B2  | 4/2017 |

OTHER PUBLICATIONS

Extended Search Report dated Oct. 22, 2018, in connection with European Patent Application No. 18186790.4, 7 pgs.

*Primary Examiner* — Yaritza Guadalupe-McCall
(74) *Attorney, Agent, or Firm* — Chiesa Shahinian & Giantomasi PC

(57) ABSTRACT

A structure applies a pre-load to a rolling bearing, which makes pre-load control easier than heretofore and enables low cost production. A pre-load applying structure is configured to apply a pre-load to a bearing of a scanning part of a three-dimensional survey device. The three-dimensional survey device includes the bearing having an inner ring to which a vertically rotating shaft is fixed, a scanning mirror attached to the vertically rotating shaft, and a motor for rotationally driving the vertically driving shaft. The pre-load applying structure has a sleeve that engages with an outer ring of the bearing, a plate spring that detachably engages with the sleeve and is fastened to a housing body with a screw, and a ring that detachably join the sleeve and the plate spring. The plate spring applies the pre-load to the outer ring via the sleeve by elastic deforming.

6 Claims, 8 Drawing Sheets

(52) U.S. Cl.
CPC ........ *F16C 35/077* (2013.01); *F16C 2226/60* (2013.01); *F16C 2229/00* (2013.01); *F16C 2370/00* (2013.01); *F16C 2370/20* (2013.01)

(58) Field of Classification Search
USPC .......................................................... 33/290
See application file for complete search history.

(56) References Cited

U.S. PATENT DOCUMENTS

2016/0102976 A1\* 4/2016 Muller ................. G01C 15/002
356/4.01
2019/0063919 A1\* 2/2019 Terashima .............. F16C 25/08

\* cited by examiner

STRUCTURE FOR APPLYING PRE-LOAD TO ROLLING BEARING AND THREE-DIMENSIONAL SURVEY DEVICE HAVING THE SAME

CROSS-REFERENCE TO RELATED APPLICATION

This application is based upon and claims the benefit of priority from Japanese Patent Application No. 2017-159097, filed Aug. 22, 2017, the entire contents of which are incorporated herein by reference.

BACKGROUND OF THE INVENTION

The present invention relates to a structure for applying a pre-load to a rolling bearing and a three-dimensional survey device having the structure.

A publicly known three-dimensional survey device may include a 3D laser scanner that may be used mounted on a tripod. Such a 3D laser scanner scans an object to be measured by emitting distance measuring light thereto, to measure a distance to a measured point, and thereby obtain three-dimensional data. The object to be measured is three-dimensionally scanned with the distance measuring light that is emitted from a scanning mirror while the scanning mirror rotates in a horizontal plane and in a vertical plane. For example, a commonly used three-dimensional survey device may have a scanning mirror that is supported rotatably in a vertical plane. This three-dimensional survey device may scan the entirety of an object to be measured, with distance measuring light that is emitted from the scanning mirror, while the entirety of the device rotates in a horizontal plane. One such device is disclosed in Japanese Patent No. 6120521, for example.

The three-dimensional survey device disclosed in Japanese Patent No. 6120521 includes a scanning unit that rotates a scanning mirror in a vertical plane. FIG. 10 shows an example of an existing scanning unit of this kind. With reference to FIG. 10, the reference sign 500 indicates a housing, the reference sign 600 indicates a vertically rotatable shaft that is rotatably supported by the housing 500, and the vertically rotatable shaft 600 protrudes from the housing 500 in a downward direction in the drawing and has a scanning mirror 700 that is fixed at a lower end part. The scanning mirror 700 rotates with the vertically rotatable shaft 600. The vertically rotatable shaft 600 is horizontally provided to a three-dimensional survey device, and thus, the scanning mirror 700 rotates in the vertical plane. The housing 500 contains a motor 800 that rotatably drives the vertically rotatable shaft 600.

The housing 500 includes a cylindrical housing body 510 and a disk-shaped lid member 520A. The housing body 510 contains the motor 800. The lid member 520A closes an opening at the upper side of the housing body 510 by being fixed to a rim of the opening of the housing body 510 with a screw 590. The vertically rotatable shaft 600 is rotatably supported by bearings 560 and 570 that are paired rolling bearings respectively fitted to a bottom of the housing body 510 and the lid member 520A. Each of the bearings 560 and 570 has an inner space that can cause slight backlash, and therefore, the bearings 560 and 570 can cause decrease in measurement accuracy if no countermeasures are taken. In view of this, a pre-load is applied to the bearing 570 in an upper side by downwardly pressing an outer ring 570a with the lid member 520A, to reduce generation of backlash. This structure is described in detail below.

As illustrated in FIG. 11, the lid member 520A includes a cylindrical sleeve part 521 and a disk part 525. The sleeve part 521 engages with the outer ring 570a of the bearing 570. The disk part 525 has a predetermined thickness that imparts sufficient stiffness and is concentric with the sleeve part 521. The disk part 525 has multiple insertion holes 525a that are formed at a periphery for inserting screws 590. On the other hand, the housing body 510 has screw holes 510a that are formed at an end surface of the rim of the opening in correspondence with the insertion holes 525a. To fix the lid member 520A to the housing body 510, the sleeve part 521 is put on the outer ring 570a of the bearing 570 so that an engaging part 521a will engage with an upper end surface of the outer ring 570a via a waved washer 595, and the screws 590 are passed through the respective insertion holes 525a and are screwed and fastened to the screw holes 510a. This fixing structure makes the waved washer 595 elastically press down the outer ring 570a, thereby applying a pre-load to the outer ring 570a. The waved washer 595 is an elastic member for applying a pre-load, and instead of the waved washer 595, the elastic member may be a spring or other part.

The pre-load applied to the bearing 570 is controlled to be in a predetermined range while a necessary bearing performance is obtained, and the pre-load is controlled by adjusting a load that generates the pre-load. Using the pre-load applying structure illustrated in FIG. 11, it is relatively easy to adjust the pre-load because the pre-load can be varied by changing the thickness or the elastic deformation amount of the waved washer 595. However, the elastic member such as the waved washer 595 may rotate and contact the outer ring 570 at a part different from an expected part, which changes the applied condition of the pre-load and causes change in accuracy of applying the pre-load.

In view of this, a pre-load applying structure as illustrated in FIGS. 12 to 14 that overcomes the above drawback has been developed. Note that structural components in FIGS. 12 to 14 that are the same as those in FIGS. 10 and 11 are represented by the same reference signs. The structure illustrated in FIGS. 12 to 14 does not have an elastic member such as the waved washer 595 for applying the pre-load but does have the lid member 520A with its shape changed. As illustrated in FIGS. 13A to 14, the new lid member 520B has the cylindrical sleeve part 521 in a similar manner as the lid member 520A, but, instead of the disk part 525, the lid member 520B has an outer peripheral annular part 522 and a plate spring part 523. The outer peripheral annular part 522 has a predetermined thickness that imparts sufficient stiffness and is concentric with the sleeve part 521. The plate spring part 523 is formed so that the thickness is thin between the sleeve part 521 and the outer peripheral annular part 522. Upper surfaces of the outer peripheral annular part 522 and the plate spring part 523 are flush with each other, and the sleeve part 521 upwardly protrudes from these upper surfaces. The outer peripheral annular part 522 has a downwardly projecting annular protrusion 522b that is formed at an inner peripheral edge. The lid member 520B has a lower surface to which a recess 520c is formed at an inner side of the protrusion 522b. The lid member 520B is an integrally formed member that is formed by cut machining a material such as aluminum.

As illustrated in FIG. 14, to fix the lid member 520B to the housing body 510, the sleeve part 521 is put on the outer ring 570a of the bearing 570 so that the engaging part 521a will engage with the upper end surface of the outer ring 570a, the protrusion 522b is fitted to the inside of the rim of the opening of the housing body 510, and the screws 590 are passed through the respective insertion holes 525a and are screwed and fastened to the screw holes 510a. In the condition in which the engaging part 521a of the sleeve part 521 engages with the upper end surface of the outer ring 570a, the outer peripheral annular part 522 of the lid member 520B and the end surface of the rim of the opening of the housing body 510 are made to have a clearance therebetween, into which a washer 580 for adjusting a pre-load is interposed as a spacer. With this structure, the fastened screw 590 presses the outer peripheral annular part 522 of the lid member 520B and thereby bends and elastically deforms the plate spring part 523, and the washer 580 is pressed by the outer peripheral annular part 522 and tightly fits to the rim of the opening. Thus, the fastening is completed. The elasticity of the plate spring part 523 in the elastically deformed condition makes the engaging part 521a of the sleeve part 521 press down the outer ring 570a, and this force is a load serving as a pre-load to the outer ring 570a.

To adjust the pre-load to be generated in the structure illustrated in FIG. 14, the clearance between the outer peripheral annular part 522 of the lid member 520B and the end surface of the rim of the opening of the housing body 510 is measured before the screw 590 is fastened, a washer 580 having a thickness corresponding to the clearance is interposed into the clearance, and then, the lid member 520B is fixed. That is, multiple washers having different thicknesses are prepared, and a washer having a thickness corresponding to the clearance is selected therefrom, whereby the pre-load is controlled. This structure is not prone to generate imbalance of the pre-load that is applied to the outer ring 570a because the engaging part 521a contacts the entire circumference of the upper end surface of the outer ring 570a, and this structure can eliminate the drawback in the structure illustrated in FIG. 11.

However, the plate spring part 523 of the lid member 520B exhibits small elastic deformation and has a small adjusting range for the pre-load because the entirety of the lid member 520B is an integrally formed member while the plate spring part 523 is held between the sleeve part 521 at the inner peripheral side and the outer peripheral annular part 522 at the outer peripheral side. This makes it necessary to prepare a large number of washers having different thicknesses and forces a complicated pre-load control. Further, since the thickness of the plate spring part 523 is difficult to make uniform with high accuracy, the load should be adjusted corresponding to the thickness of the plate spring part 523, which also makes the control complicated. Additionally, the complicated shape of the lid member 520B itself increases cost.

SUMMARY OF THE INVENTION

In view of these circumstances, an object of the present invention is to provide a structure for applying a pre-load to a rolling bearing, which makes the pre-load control easier than heretofore and enables low cost production.

A first aspect of the present invention provides a structure for applying a pre-load to a rolling bearing of a rotational mirror driving unit. The rotational mirror driving unit includes the rolling bearing, a mirror, and a rotational driving part. The rolling bearing has an outer ring and an inner ring to which a first rotating shaft is fixed. The mirror constitutes an optical system and is attached to the first rotating shaft. The rotational driving part is configured to rotationally drive the first rotating shaft. The structure includes an engaging member that engages with the outer ring, a plate spring that detachably engages with the engaging member and that has a fastening part to be fixed to a fixing member, and a joining member that detachably joins the engaging member and the plate spring. In a condition in which the fastening part of the plate spring is fastened to the fixing member by a fastening member, the plate spring elastically deforms, and the elasticity of the plate spring applies a pre-load to the outer ring via the engaging member.

According to the present invention, a mechanism that applies a pre-load to the rolling bearing includes the three members: the engaging member, the plate spring, and the joining member, and the plate spring having an elasticity for applying a pre-load is an independent member. Thus, the elastic deformation of the plate spring is not prone to be restricted by the other two members, which are the engaging member and the joining member. This provides an elastic deformation amount greater than that of an existing plate spring part of an integrally formed type, such as the plate spring part 523 of the lid member 520B illustrated in FIGS. 13A to 14. As a result, it is only necessary to prepare a plate spring having an elasticity corresponding to a pre-load to be applied, to apply a pre-load with an appropriate load, whereby the pre-load control is made easier than heretofore. Further, the plate spring configured to be an independent member can be made of a general-purpose plate spring. Thus, spring characteristics, yield strength, and other factors of the plate spring are appropriately adjusted corresponding to a desired pre-load, by selecting material, thickness, and other specifications accordingly.

In the present invention, the engaging member configured to be an independent member, the plate spring, and the joining member are formed into simple shapes. These members may be individually processed and be produced to shorten the production time more than in a case of producing an existing lid member with a complicated shape by integral forming. In this case, also, the plate spring can be made of a general-purpose plate spring. For these reasons, the present invention enables decrease in the production cost much greater than heretofore.

According to a second aspect of the present invention, the fastening part of the plate spring and the fixing member may have a spacer therebetween. The spacer may be a washer, a shim, or other part. With the spacer thus interposed, the clearance between the spacer and the plate spring represents the elastic deformation amount of the plate spring. The appropriate selection of a plate spring corresponding to a desired pre-load eliminates the need to finely change the thickness of the spacer. As a result, it is not necessary to prepare a large number of spacers having different thicknesses, thereby allowing an easy pre-load control with a spacer.

According to a third aspect of the present invention, the fastening member may include a screw member that screws with the fixing member to fasten the fastening part to the fixing member. In the case in which the fastening member is the screw member, the screw member is passed through the plate spring and is screwed and fastened to the fixing member. This makes the plate spring elastically deform, and a pre-load is applied from the plate spring to the rolling bearing via the engaging member. The load for the pre-load is finely adjusted by means of screwing of the spring member.

According to a fourth aspect of the present invention, the structure may further include a pressing plate that presses down the plate spring in a condition of being laminated on the plate spring and being fixed to the fixing member by the fastening member. This structure reduces distortion of the plate spring.

According to a fifth aspect of the present invention, the engaging member may directly engage with the outer ring by contacting a surface of an entire periphery of the outer ring. In this case, the pre-load is applied uniformly to the entire periphery of the outer ring, which enables highly accurate pre-load adjustment.

A sixth aspect of the present invention provides a three-dimensional survey device including a rotational mirror driving unit, a unit-rotation driving unit, a light source, and a distance measuring unit. The rotational mirror driving unit includes a rolling bearing, a mirror, and a rotational driving part. The rolling bearing has an outer ring and an inner ring to which a first rotating shaft is fixed. The mirror constitutes an optical system and is attached to the first rotating shaft. The rotational driving part configured to rotationally drive the first rotating shaft. The unit-rotation driving unit rotates the rotational mirror driving unit via a second rotating shaft that orthogonally crosses an axis direction of the first rotating shaft. The light source also constitutes the optical system and emits distance measuring light to the minor. The distance measuring unit receives the distance measuring light after the distance measuring light reflected at the mirror is emitted to an object to be measured, is reflected back, and enters the mirror, and the distance measuring unit calculates a distance to the object to be measured on a basis of the received distance measuring light. The rolling bearing is provided with the structure according to any one of the first to the fifth aspects of the present invention.

The structure for applying a pre-load to the rolling bearing of the present invention makes the pre-load control easier than heretofore and enables low cost production.

PREFERRED EMBODIMENTS OF THE INVENTION

Hereinafter, an embodiment of the present invention will be described with reference to the drawings.

(1) Entire Configuration and Function of Three-Dimensional Survey Device

Figure 1:
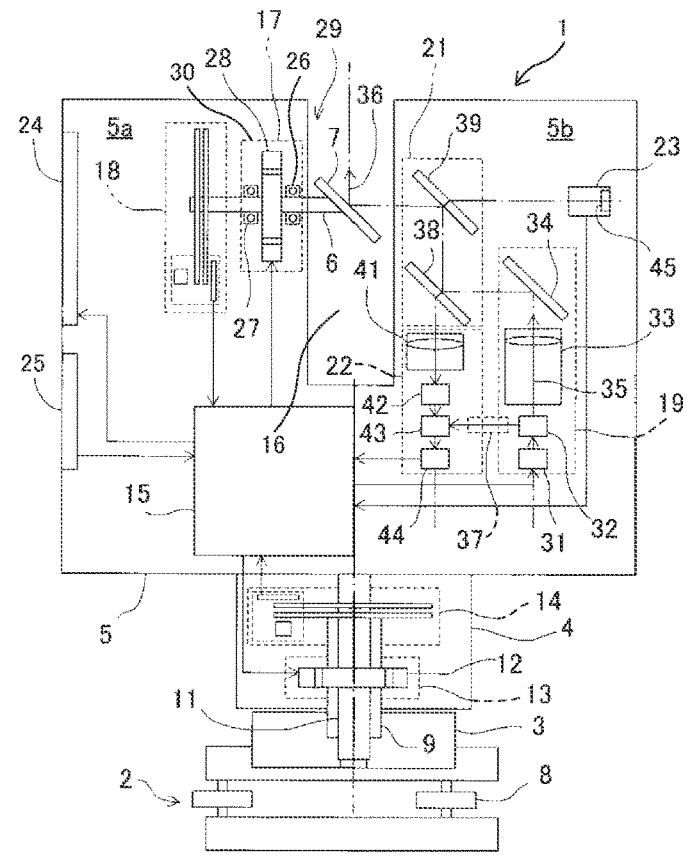
FIG. 1 is a front sectional view schematically showing a three-dimensional survey device according to an embodiment of the present invention.

First, with reference to FIG. 1, a three-dimensional survey device (hereinafter called a "survey device") 1 according to an embodiment is described. The survey device 1 uses a three-dimensional laser scanner. The survey device 1 includes a tribrach 2 that is to be mounted on a tripod (not shown), a base 3 provided on the tribrach 2, a frame unit 5 provided to the base 3 via a horizontally rotating unit 4 in a horizontally rotatable manner, and a scanning mirror 7 that is provided to the frame unit 5 rotatably around a vertically rotating shaft 6 along a vertical plane. The vertically rotating shaft 6 is an example of a first rotating shaft of the present invention.

The tribrach 2 has, for example, three adjusting screws 8. A rotated amount of the adjusting screw 8 is adjusted so that a tilt sensor (not shown) provided to the frame unit 5 will detect a horizontal condition, whereby the tribrach 2 levels the survey device 1.

The horizontally rotating unit 4 has a horizontally rotating shaft 11 that extends vertically. The horizontally rotating shaft 11 is an example of a second rotating shaft of the present invention. The horizontally rotating shaft 11 is rotatably supported by the base 3 via a bearing 9. The frame unit 5 is supported at an upper end of the horizontally rotating shaft 11 and rotates with the horizontally rotating shaft 11.

The horizontally rotating unit 4 contains a horizontal driving unit 13 with a motor 12 and also contains a horizontal angle measuring unit 14 that measures a rotation angle of the horizontally rotating shaft 11. The motor 12 is an example of a unit-rotation driving unit of the present invention. The horizontal angle measuring unit 14 is, for example, an encoder. The motor 12 rotates the frame unit 5 around the horizontally rotating shaft 11. The rotation angle of the horizontally rotating shaft 11 relative to the base 3, that is, the rotation angle of the frame unit 5 is measured by the horizontal angle measuring unit 14. The measurement result of the horizontal angle from the horizontal angle measuring unit 14 is input to a control operating unit 15 that is contained in the frame unit 5. The control operating unit 15 controls driving of the motor 12 on the basis of the measurement result.

The frame unit 5 has a cut part 16 that is formed at a center, and the cut part 16 opens upwardly and a front-back direction, which is a surface-back direction of the paper surface. Chambers 5a and 5b are respectively formed at left and right sides of the cut part 16. The chamber 5a in a left side in FIG. 1 contains a vertically driving unit 17 and a vertical angle measuring unit 18, whereas the chamber 5b contains a distance-measuring-light emitting unit 19, a common light-path part 21, a distance measuring part 22, an imaging unit 23, and other units. The frame unit 5 is provided with a display 24 and a controller 25.

The controller 25 receives an input such as settings of conditions necessary for measurement, instruction for starting measurement, and other information. The conditions necessary for the measurement include a measurement area, a point cloud data density, and imaging conditions. These pieces of input information input via the controller 25 are displayed on the display 24.

The vertically driving unit 17 includes a housing 30 that is contained in the chamber 5a of the frame unit 5, the vertically rotating shaft 6 that penetrates through the housing 30, and a motor 28 that is contained in the housing 30 and that rotationally drives the vertically rotating shaft 6. The motor 28 is an example of a rotational driving part of the present invention. The vertically rotating shaft 6 has an axis direction that extends horizontally and is rotatably supported by the housing 30 via a pair of bearings 26 and 27. An end of the vertically rotating shaft 6 protrudes to the cut part 16, and the protruding end is provided with the scanning mirror 7 in a condition in which the scanning mirror 7 tilts by 45 degrees relative to a shaft center of the vertically rotating shaft 6. The scanning mirror 7 is supported by the vertically rotating shaft 6 within the cut part 16 and rotates around the vertically rotating shaft 6 along a vertical plane. In this embodiment, the vertically driving unit 17 and the scanning mirror 7 constitute the scanning part 29.

The vertically rotating shaft 6 is provided with the vertical angle measuring unit 18. The vertical angle measuring unit 18 uses, for example, an incremental encoder. The vertical angle measuring unit 18 measures a rotation angle of the vertically rotating shaft 6 relative to the frame unit 5. The measurement result of the vertical angle from the vertical angle measuring unit 18 is input to the control operating unit 15. The control operating unit 15 controls driving of the motor 28 on the basis of the measurement result.

The distance-measuring-light emitting unit 19 includes a distance measuring light source 31, a light path dividing member 32 such as a half mirror or a beam splitter, a phototransmitting optical part 33 using an objective lens and other parts, and a mirror 34. The distance measuring light source 31 uses, for example, a semiconductive laser and emits pulsed laser beam of invisible infrared light to a distance measuring light axis 36 as distance measuring light 35. The distance measuring light source 31 is controlled by the control operating unit 15 so that pulsed light will be emitted in the condition of having a predetermined optical intensity, a predetermined pulse interval, and other parameters.

The common light-path part 21 includes a first beam splitter 38 and a second beam splitter 39. The distance measuring part 22 includes a light receiving optical part 41, a light path extending part 42, a light path connecting part 43, and a light receiving element 44.

The distance measuring light 35 output from the distance measuring light source 31 partially passes through the light path dividing member 32 and enters the mirror 34 via the phototransmitting optical part 33. The distance measuring light 35 is reflected at the mirror 34 to the common light-path part 21. The rest of the distance measuring light 35 serves as an internal reference light and is reflected by the light path dividing member 32 to an internal reference light path 37.

The distance measuring light 35 reflected at the mirror 34 is then successively reflected at the first beam splitter 38 and the second beam splitter 39 and is introduced to the scanning mirror 7. The distance measuring light 35 that passes through the first beam splitter 38 and the second beam splitter 39 are absorbed by an antireflection member (not shown). The scanning mirror 7 is a deflecting optical member, and the scanning mirror 7 orthogonally reflects the distance measuring light 35 entering from a horizontal direction and reflects reflected distance measuring light that enters itself, to the second beam splitter 39 in the horizontal direction. The reflected distance measuring light is described later.

The distance measuring light 35 is introduced from the second beam splitter 39 of the common light-path part 21 to the scanning mirror 7, is reflected at the scanning mirror 7, and is emitted to an object to be measured (not shown). As the scanning mirror 7 is rotationally driven by the motor 28 via the vertically rotating shaft 6, the distance measuring light 35 reflected by the scanning mirror 7 is rotationally emitted along the vertical plane. Meanwhile, as the frame unit 5 is rotationally driven along a horizontal plane by the horizontally rotating unit 4, the distance measuring light 35 is rotationally emitted in a horizontal direction around the horizontally rotating shaft 11. Thus, the rotation in the vertical direction of the scanning mirror 7 in conjunction with the rotation in the horizontal direction of the frame unit 5 make the distance measuring light 35 scan the whole of a three-dimensional measurement area.

The distance measuring light 35 that scans the object as described above is reflected at this object and enters the scanning mirror 7 as the reflected distance measuring light. The reflected distance measuring light that enters the scanning mirror 7 is reflected at the scanning mirror 7, enters the common light-path part 21, is further reflected by the second beam splitter 39, passes through the first beam splitter 38, and is introduced to the distance measuring part 22.

In the distance measuring part 22, the reflected distance measuring light that has passed through the first beam splitter 38 is introduced to the light receiving element 44, whereas the internal reference light that is introduced by the internal reference light path 37 is further introduced to the light receiving element 44 via the light path connecting part 43. That is, the reflected distance measuring light that has passed through the first beam splitter 38 enters the light receiving optical part 41 and is thereby focused, and then this light passes through the light path extending part 42 and is received by the light receiving element 44 via the light path connecting part 43. The internal reference light passed through the internal reference light path 37 is received by the light receiving element 44 via the light path connecting part 43.

The reflected distance measuring light and the internal reference light that are received by the light receiving element 44 are respectively converted into a reflected-distance-measuring-light electric signal and an internal-reference-light electric signal at the light receiving element 44, and these electric signals are sent to the control operating unit 15. The control operating unit 15 measures a distance to the object on the basis of a difference of a time interval between the reflected-distance-measuring-light electric signal and the internal-reference-light electric signal.

The control operating unit 15 calculates coordinate values of the object on the basis of the distance to the object that is measured as described above, a vertical angle measured by the vertical angle measuring unit 18, and a horizontal angle measured by the horizontal angle measuring unit 14. The coordinate values of the object for each pulse may be recorded to obtain point cloud data relating to the whole measurement area or the object. The coordinate values and the point cloud data are stored in a storage of the control operating unit 15.

The imaging unit 23 has an imaging element 45 that is provided on an imaging optical axis of the imaging unit 23. The imaging element 45 outputs a digital image signal. The imaging element 45 is constituted of an aggregate of pixels, such as a CCD sensor or a CMOS sensor, and each pixel can be located in the imaging element 45. The imaging unit 23 obtains image data of the object during the distance measurement. The image data is stored in the storage of the control operating unit 15.

The storage of the control operating unit 15 also stores a sequence program for executing distance measurement, vertical angle measurement, and horizontal angle measurement, an arithmetic program for performing calculation for distance measurement or other calculation, a measurement data processing program for processing the measurement data, an imaging program for controlling an imaging condition of the imaging unit 23, a program such as an image processing program for processing an image, a program for integrally controlling these programs, and other programs.

The measurement data stored in the storage is transmitted to a personal computer (PC) or other device, for example, by a wired communication or a wireless communication. The measurement data may be accumulated and be analyzed or may be subjected to other process. Alternatively, or additionally, the measurement data may be stored in an external storage medium such as a hard disk or a memory card so as to be movable to a PC or other device.

(2) Structure of Scanning Part

Next, the scanning part 29 is described with reference to FIGS. 2 to 9. The scanning part 29 includes the vertically driving unit 17 and the scanning mirror 7. The scanning part 29 is an embodiment of a rotational mirror driving unit of the present invention.

Figure 2:
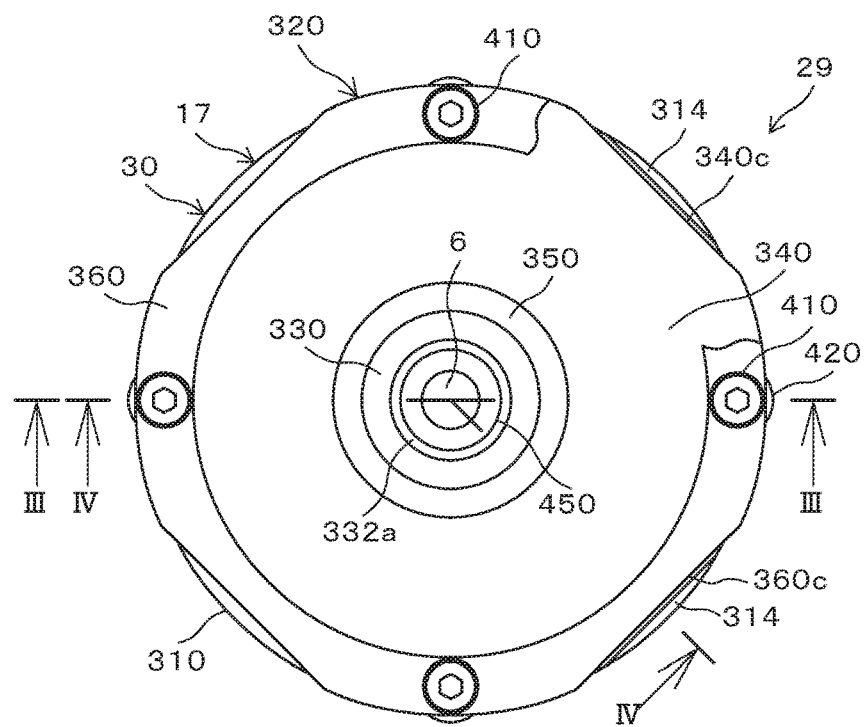
FIG. 2 is a plane view of a scanning part included in the three-dimensional survey device in FIG. 1.
Figure 3:
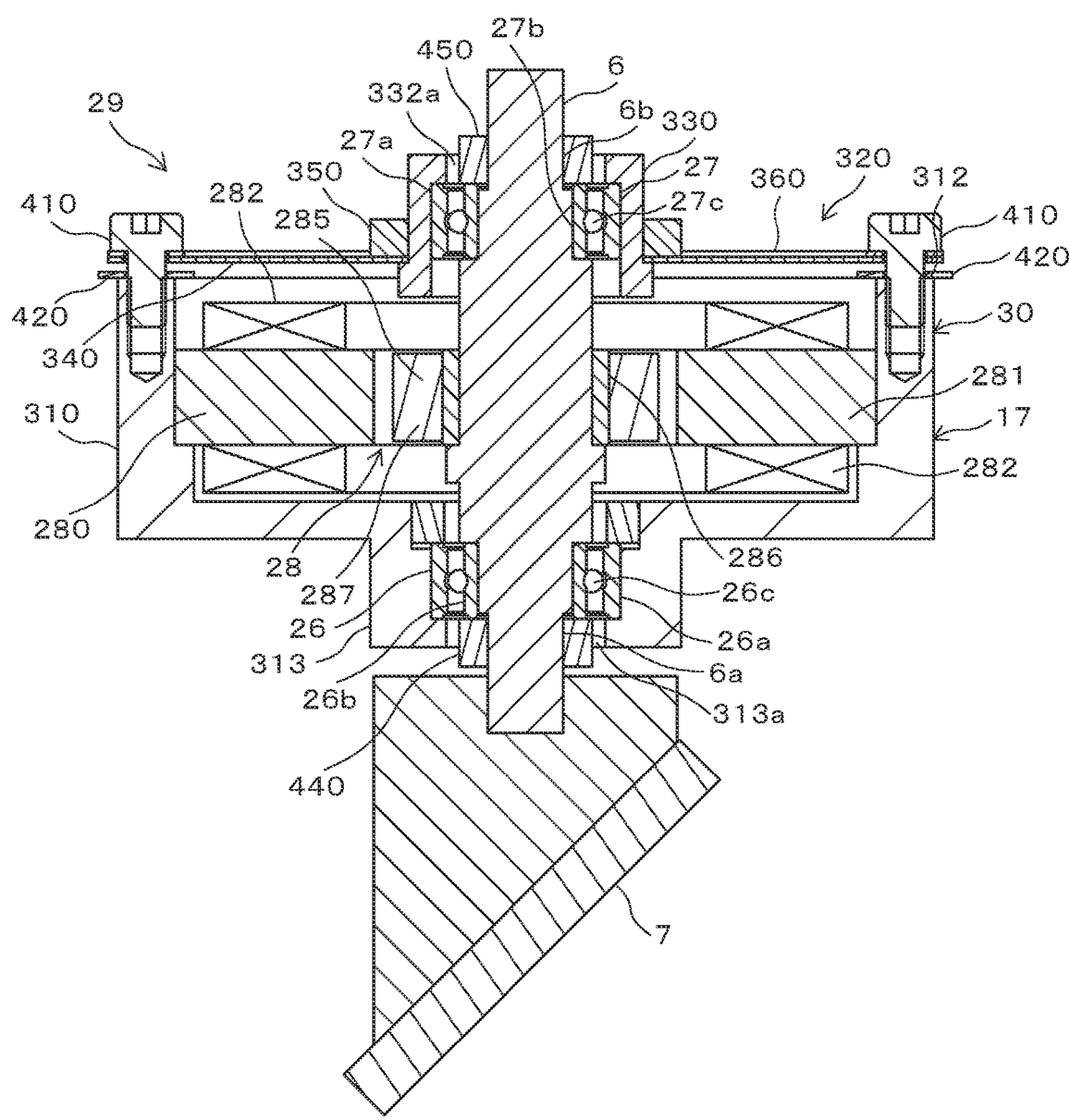
FIG. 3 is a sectional view taken along an arrow III-III in FIG. 2.
Figure 4:
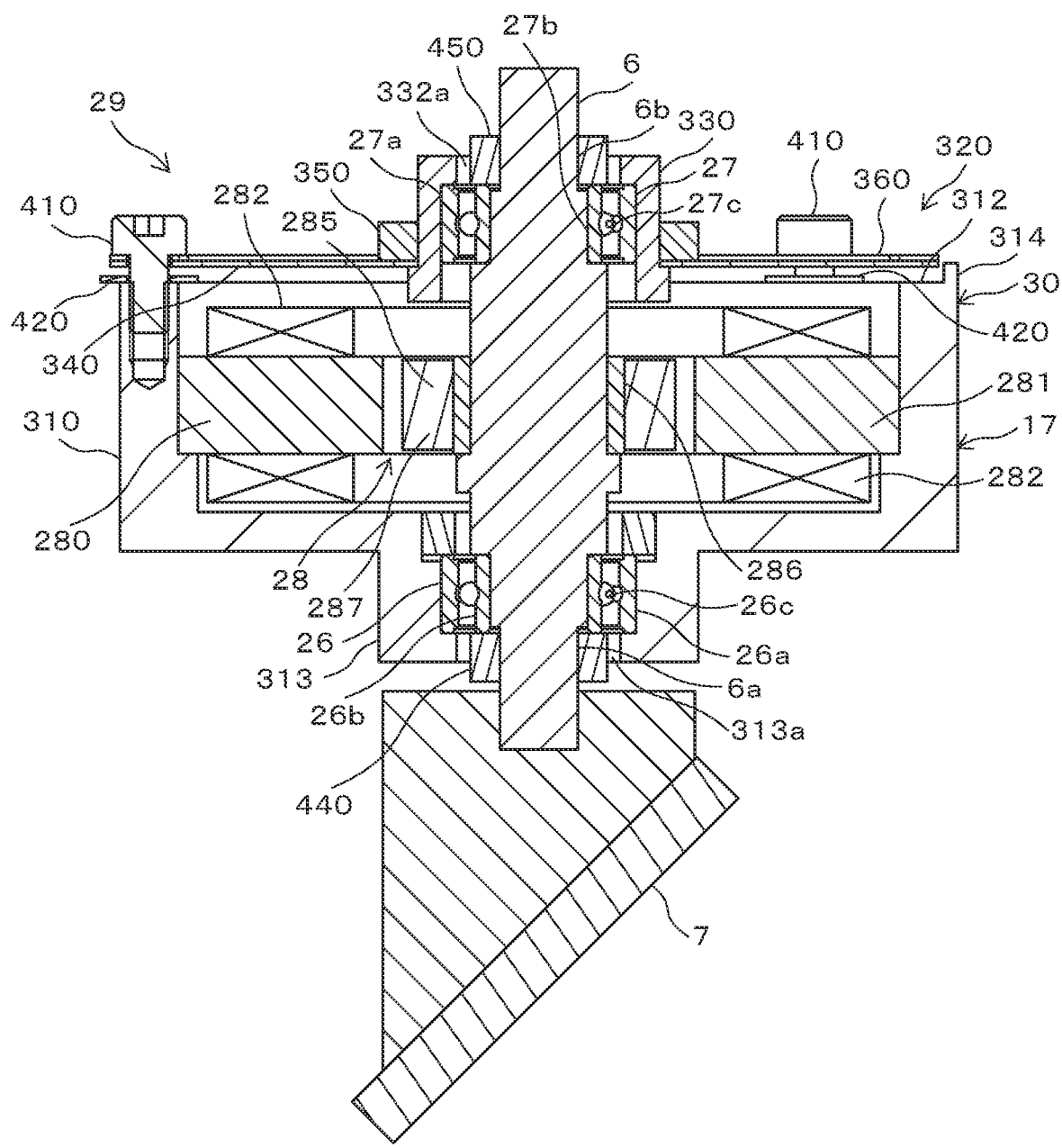
FIG. 4 is a sectional view taken along an arrow IV-IV in FIG. 2.

FIGS. 2 to 4 illustrate the scanning part 29. In the survey device 1, the vertically driving unit 17 is incorporated in the condition in which the axis direction of the vertically rotating shaft 6 extends horizontally, as illustrated in FIG. 1. However, the vertically driving unit 17 illustrated in FIGS. 3 and 4 is in the condition in which the axis direction of the vertically rotating shaft 6 is vertically arranged, and thus, the scanning mirror 7 is provided at a lower end of the vertically rotating shaft 6. The "vertical direction" described below represents the vertical direction in FIGS. 3 and 4.

As illustrated in FIGS. 2 to 4, the housing 30 has a bottomed cylindrical housing body 310 with an opening at an upper side and a lid member 320 that is used to close an opening of the housing body 310 by being fixed to a rim 312 of the opening of the housing body 310 with a screw 410. The housing body 310 is an example of a fixing member of the present invention. The screw 410 is an example of a fastening member or a screw member of the present invention. The vertically rotating shaft 6 penetrates the center of the housing 30 and has upper and lower ends that protrude outwardly from the housing 30. The lower end of the vertically rotating shaft 6 is provided with the scanning mirror 7. The upper end of the vertically rotating shaft 6 is provided with the vertical angle measuring unit 18 illustrated in FIG. 1. The screw 410 is a hexagon socket screw with a head.

The motor 28 includes a stator 280 and a rotor 285. The stator 280 is fixed to an inside circumferential surface of the housing body 310. The rotor 285 is fixed to the vertically rotating shaft 6. The stator 280 is made by winding a coil 282 around a stator core 281 that is fixed to the inside circumferential surface of the housing body 310. The rotor 285 is made by fixing a magnet 287 in proximity to the stator core 281 at an outer circumference of the rotor core 286 that is fixed to the vertically rotating shaft 6, and thus, the rotor 285 rotates with the vertically rotating shaft 6.

The bearing 26 is fitted at the center of the bottom of the housing body 310, whereas the bearing 27 is fitted at the center of the lid member 320. The bearing 26 is a rolling bearing that has a cylindrical outer ring 26*a* and an inner ring 26*b* between which multiple spherical rolling bodies 26*c* are inserted. The bearing 27 is also a rolling bearing that has a cylindrical outer ring 27*a* and an inner ring 27*b* between which multiple spherical rolling bodies 27*c* are inserted.

The bearing 26 at the lower side is fixed by fitting the outer ring 26*a* to a hollow of a boss 313, and the lower end of the vertically rotating shaft 6 is press fitted into the inner ring 26*b*. The boss 313 is formed at the center of the bottom of the housing body 310 and protrudes downwardly. An end of the vertically rotating shaft 6 positioned lower than the bearing 26 penetrates through a through hole 313*a* that is formed at the bottom of the boss 313. The lower end of the vertically rotating shaft 6 is formed with a screw part 6*a*, to which a nut 440 is screwed to fasten the inner ring 26*b* and the vertically rotating shaft 6. The nut 440 is positioned inside the through hole 313*a*.

On the other hand, the bearing 27 at the upper side is fixed by press fitting the upper end of the vertically rotating shaft 6 into the inner ring 27*b*, and the outer ring 27*a* is fitted into a sleeve 330, which is described later. The upper end of the vertically rotating shaft 6 is formed with a screw part 6*b*, to which a nut 450 is screwed to fasten the inner ring 27*b* and the vertically rotating shaft 6.

Figure 5:
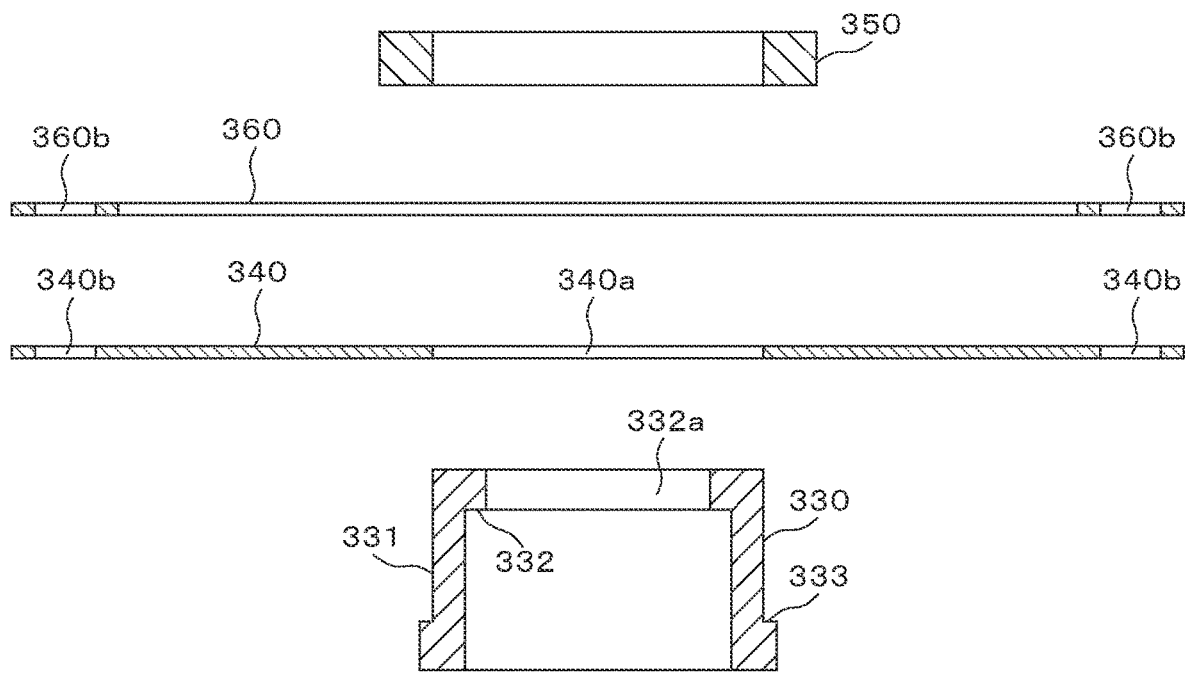
FIG. 5 is a sectional view of a disassembled lid member that constitutes a housing of the scanning part.

As illustrated in FIG. 5, the lid member 320 includes a cylindrical sleeve 330, a disk-shaped plate spring 340, a ring 350, and an annular pressing plate 360. The sleeve 330 engages from the upper side, with the outer ring 27*a* of the bearing 27 at the upper side. The plate spring 340 engages with the sleeve 330 from the upper side and is fixed to the rim 312 of the opening of the housing body 310 by the screw 410. The ring 350 detachably joins the sleeve 330 and the plate spring 340. The ring 350 is an example of a joining member of the present invention. The pressing spring 360 is fixed to the rim 312 of the opening of the housing body 310 by the screw 410 together with the plate spring 340 while being laminated on an upper surface of a periphery of the plate spring 340.

The sleeve 330 has a cylindrical part 331 as a main body. The cylindrical part 331 has an annular engaging part 332 that is formed at an upper end inner periphery. The engaging part 332 is an example of an engaging member of the present invention. The engaging part 332 is formed with a through hole 332*a* through which the upper end of the vertically rotating shaft 6 penetrates. The nut 450 is positioned inside the through hole 332*a*. The cylindrical part 331 also has a flange 333 that is formed at a lower end outer periphery. The sleeve 330 engages with the bearing 27 at the upper side in the condition in which the outer ring 27*a* is fitted to the inside of the sleeve 330 by putting the sleeve 330 on the bearing 27 so that the engaging part 332 contacts the upper end surface of the outer ring 27*a*.

Figure 6:
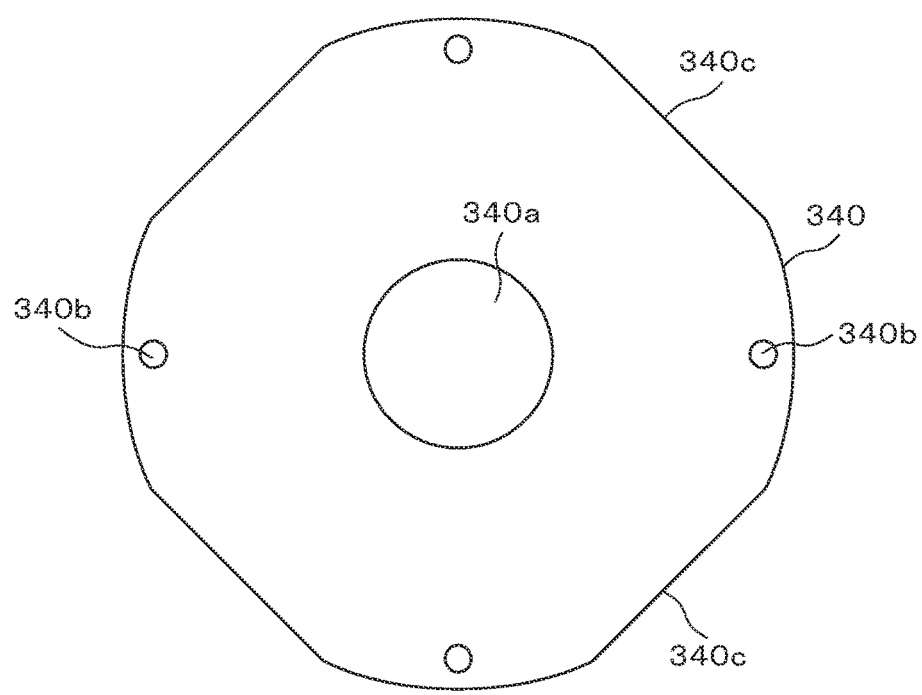
FIG. 6 is a plane view of a plate spring that constitutes the lid member.

As illustrated in FIGS. 5 and 6, the plate spring 340 has a circular hole 340*a* formed at its center and also has an insertion hole 340*b* for the screw 410 that is formed at each of equally divided positions of the circumference of the periphery. In this embodiment, the insertion hole 340*b* is formed at four positions. The circular hole 340*a* is a hole into which the cylindrical part 331 of the sleeve 330 is fitted, and the circular hole 340*a* has an inner diameter that is smaller than an outer diameter of the flange 333. A part of an outer peripheral edge of the plate spring 340 between the insertion holes 340b is formed with a linear cut part 340c with a predetermined length. In this embodiment, the cut part 340c is formed at each of the four positions, and a pair of the cut parts 340c opposing via the circular hole 340a are parallel with each other. The plate spring 340 may be obtained by punching an elastic metal plate with a predetermined thickness. Although the plate spring 340 can be made of any appropriate metal material, the preferable example of the metal material includes brass, stainless steel, aluminum, and steel from the point of view of processability and spring characteristics.

The ring 350 is screwed to an outer peripheral surface of the cylindrical part 331 of the sleeve 330 to hold an inner peripheral edge of the plate spring 340 with the flange 333, thereby joining the plate spring 340 and the sleeve 330. That is, the outer peripheral surface of the cylindrical part 331 is formed with an external thread, whereas the inner peripheral surface of the ring 350 is formed with an internal thread for screwing with the external thread. The sleeve 330 and the plate spring 340 can be separated from each other by taking the ring 350 off from the cylindrical part 331.

Figure 7:
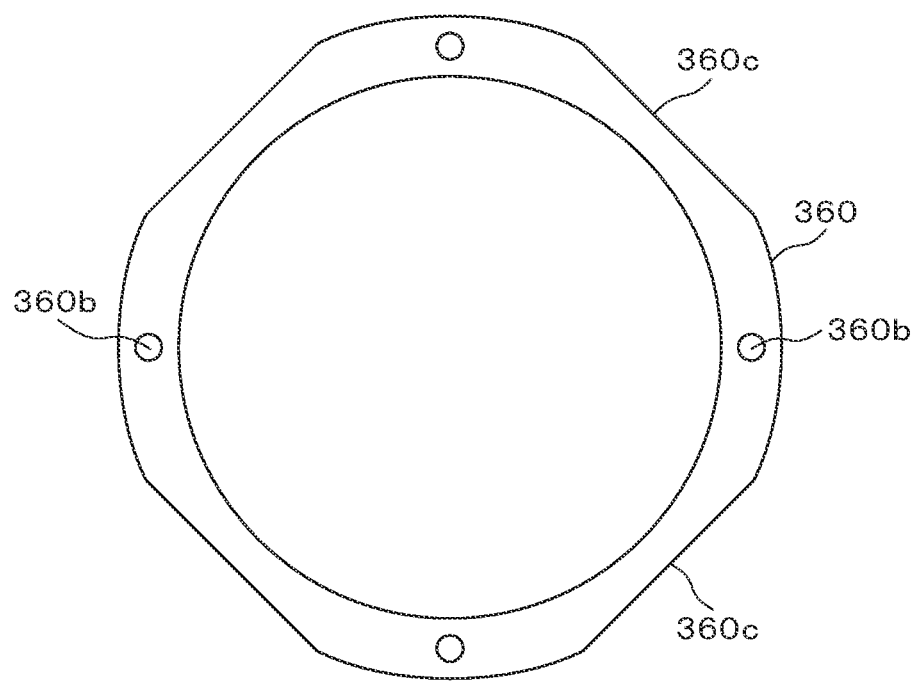
FIG. 7 is a plane view of a pressing plate that constitutes the lid member.

As illustrated in FIGS. 5 and 7, the pressing plate 360 has an outer peripheral edge with the same shape and same dimensions as the plate spring 340 and has multiple insertion holes 360b and multiple cut parts 360c that are formed at an periphery in a similar manner as in the plate spring 340. Each of the insertion holes 360b is used to pass the screw 410 therethrough. The pressing plate 360 downwardly presses the plate spring 340 while being laminated on a top surface of the periphery of the plate spring 340 to reduce generation of deflection in a peripheral direction of the plate spring 340. For this reason, the pressing plate 360 uses a metal plate having a stiffness higher than that of the plate spring 340. For example, the pressing plate 360 may be made of a stainless steel plate material with an appropriate thickness.

The lid member 320 is assembled by fitting the cylindrical part 331 of the sleeve 330 into the circular hole 340a of the plate spring 340 and screwing the ring 350 with the cylindrical part 331 to join the plate spring 340 with the sleeve 330. At this time, the pressing plate 360 is laminated on the plate spring 340 in fixing the plate spring 340 to the housing body 310 with the screw 410.

Figure 8:
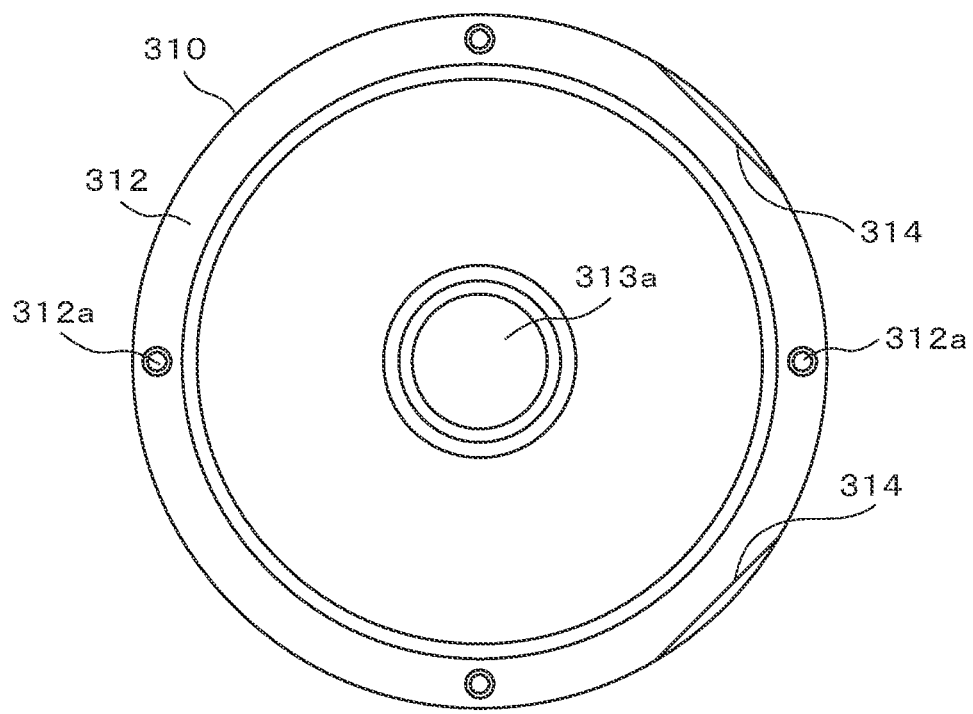
FIG. 8 is a plane view of a housing body of the housing.

As illustrated in FIG. 8, the rim 312 of the opening of the housing body 310, to which the lid member 320 is fixed, has multiple screw holes 312a that are formed at an end surface. The screw holes 312a are to be screwed with the screws 410. Further, the rim 312 of the opening has multiple frames 314 that protrude and are provided so as to position the plate spring 340 and the pressing plate 360 in the peripheral direction. In this embodiment, two frames 314 are provided.

Each of the frames 314 has a linear inner wall surface and an outer wall surface. The inner wall surface is to face the cut parts 340c and 360c of the plate spring 340 and the pressing plate 360. The outer wall surface is curved in accordance with the outer peripheral surface of the housing body 310. Each of the two frames 314 is provided between the screw holes 312a among the three screw holes 312a that are continuously adjacent to each other in the peripheral direction. The inner wall surfaces of the frames 314 orthogonally cross each other. As illustrated in FIG. 2, the positioning in the peripheral direction of the plate spring 340 and the pressing plate 360 is easily performed because it only requires fitting the cut parts 340c and 360c of the plate spring 340 and the pressing plate 360 to the insides of the frames 314. In this condition, the insertion holes 340b and 360b coincide with the screw holes 312a. Note that a part of the pressing plate 360 is cut in FIG. 2 in order to show the condition of the cut part 340c of the plate spring 340 fitting to the inside of the frame 314.

In this embodiment, the lid member 320, which is fixed to the rim 312 of the opening of the housing 30, applies a pre-load to the bearing 27, which leads to application of the pre-load to both of the bearings 26 and 27. The following describes this function.

(3) Structure for Applying Pre-Load to Bearing by Lid Member

The lid member 320 is incorporated to the vertically rotating shaft 6 and the housing body 310 as described below. First, after the sleeve 330 is joined with the plate spring 340 by the ring 350, the sleeve 330 is engaged with the bearing 27 in the condition in which the outer ring 27a is fitted within the cylindrical part 331 by putting the sleeve 330 on the bearing 27 so that the engaging part 332 contacts the upper end surface of the outer ring 27a. Meanwhile, the two cut parts 340c of the plate spring 340 are fitted to the inside of the two frames 314, respectively, to position the plate spring 340 in the peripheral direction relative to the housing body 310. Thereafter, the pressing plate 360 is laminated on the top surface of the periphery of the plate spring 340 by fitting the cut parts 360c to the insides of the frames 314.

The periphery of the plate spring 340 and the end surface of the rim 312 of the opening of the housing body 310 are made to have a clearance therebetween in this condition. The insertion holes 340b and 360b of the plate spring 340 and the pressing plate 360 coincide with the screw holes 312a in this condition.

Thereafter, the screws 410 are passed through the insertion holes 340b and 360b to the screw holes 312a and are screwed and fastened. The plate spring 340 has the inner peripheral edge that engages with the outer ring 27a via the sleeve 330 while engaging with the flange 333. Thus, the periphery of the plate spring 340 is downwardly pressed by the screws 410 by an amount corresponding to the clearance and is elastically deformed, thereby generating a downward load applied to the outer ring 27a. In more detail, the pre-load is applied from the outer ring 27a to the bearing 27 while a peripheral part of the insertion hole 340b of the plate spring 340 pressed by the head of the screw 410, that is, a fastened part of the plate spring 340, functions as a point applied with force, whereas the engaging part 332 of the sleeve 330 engaging with the upper end surface of the outer ring 27a functions as a point of application. The load to the outer ring 27a is transmitted to the bearing 26 at the lower side through the rolling bodies 27c and the vertically rotating shaft 6, and thus, a pre-load is applied to the bearing 26. Such an application manner of the pre-load reduces generation of backlash in the bearings 26 and 27, thereby enabling the scanning mirror 7 to rotate at high accuracy, resulting in improvement and stabilization in the measurement accuracy of the distance measurement.

The pressing plate 360 is fixed to the housing body 310 by the screws 410 together with the plate spring 340 and thereby downwardly presses the periphery of the plate spring 340. The pressing plate 360 reduces generation of deflection in the peripheral direction of the plate spring 340 by its stiffness.

(4) Control of Pre-Load

Figure 9:
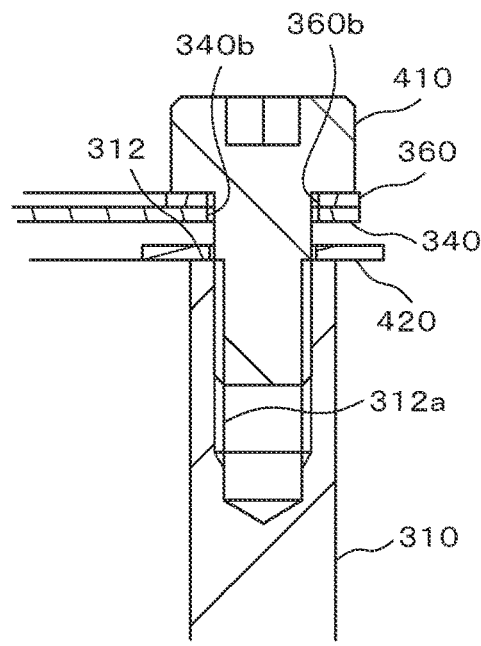
FIG. 9 is a sectional view of a structure for fixing the plate spring and the pressing plate to the housing body.
Figure 10:
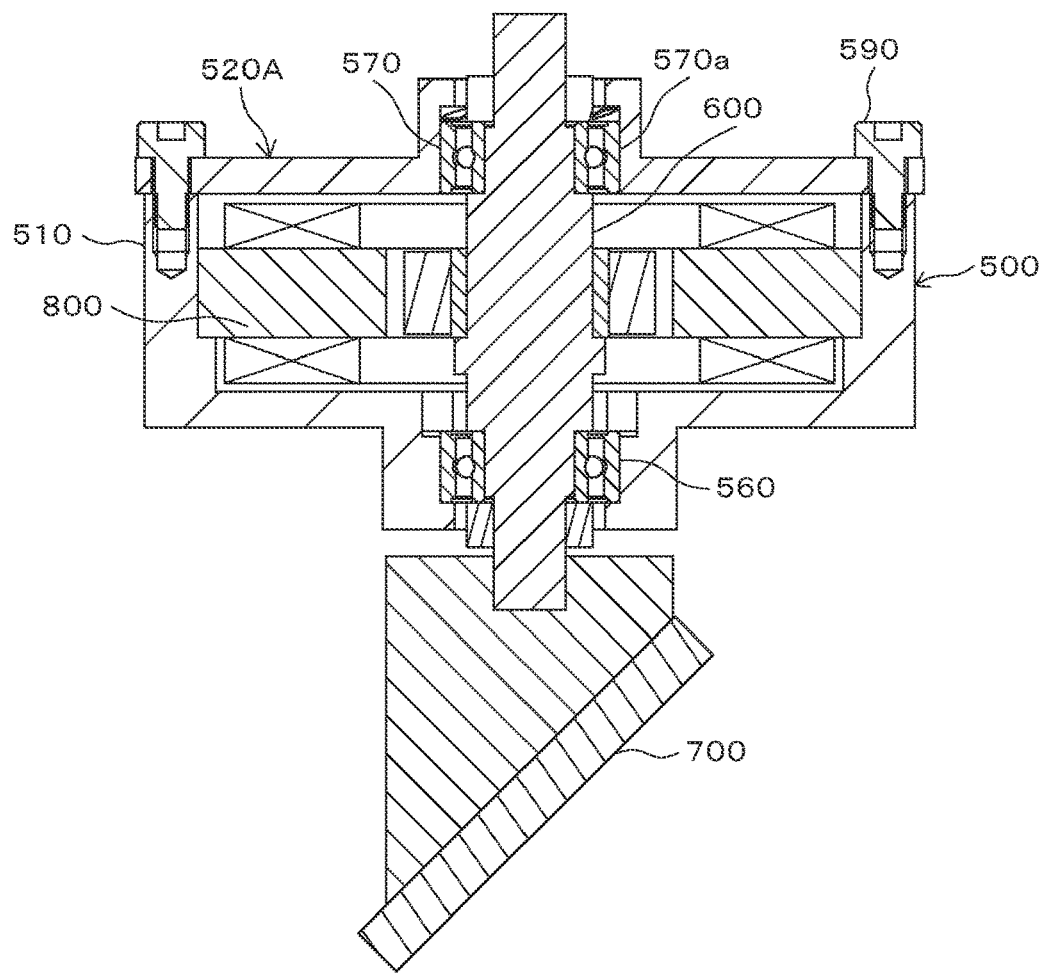
FIG. 10 is a sectional view showing an example of an existing scanning part that is included in a three-dimensional survey device.
Figure 11:
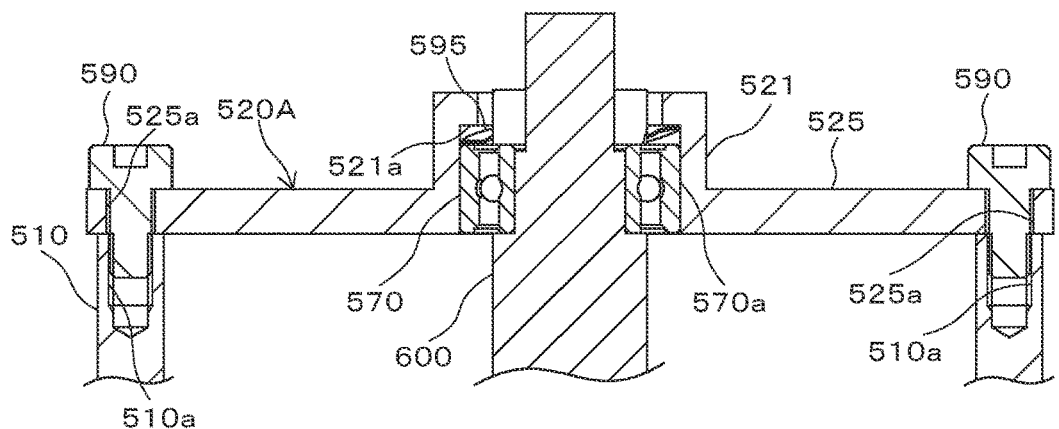
FIG. 11 is a sectional view showing details of a structure for applying a pre-load to a bearing of the scanning part in FIG. 10.
Figure 12:
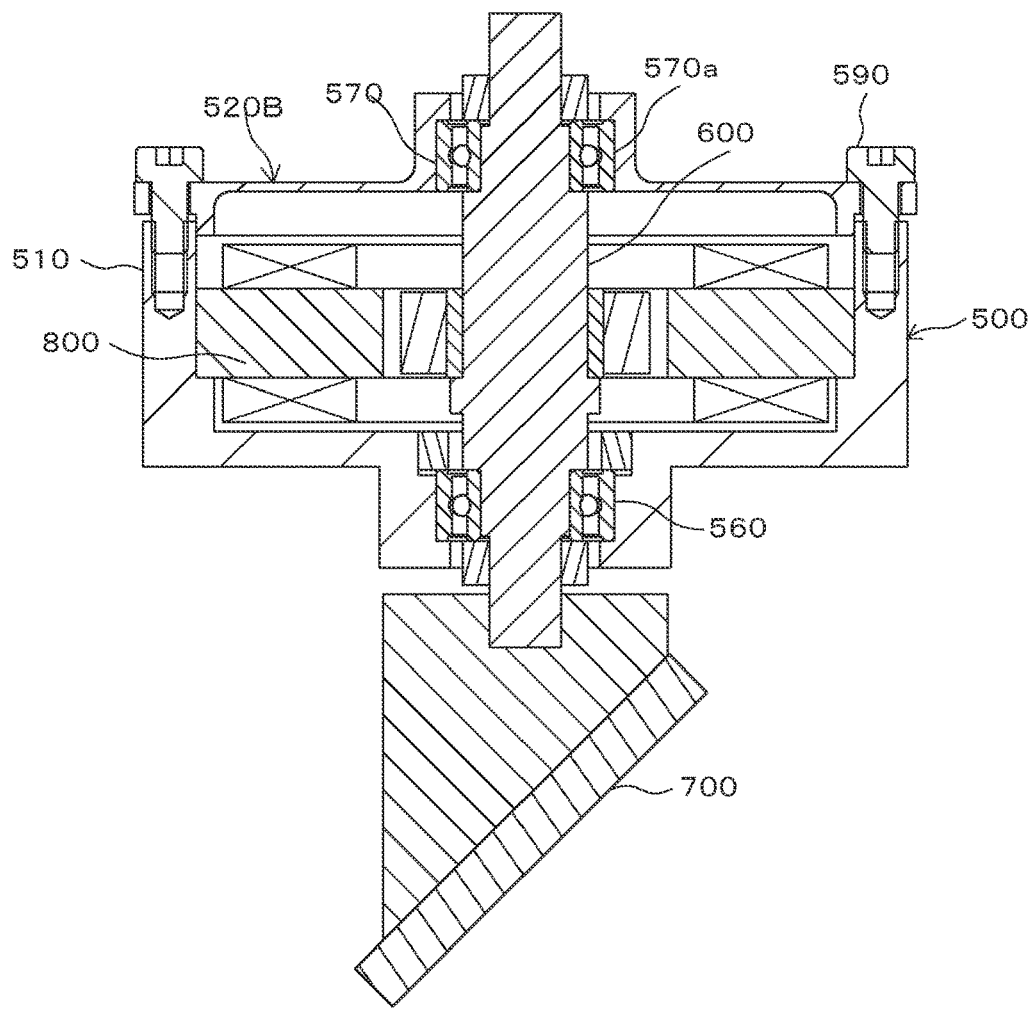
FIG. 12 is a sectional view showing another example of an existing scanning part that is included in a three-dimensional survey device.

The pre-load is thus applied to the bearing 27. This pre-load is controlled by adjusting a load to be applied to the sleeve 330 as follows. First, the clearance amount between the periphery of the plate spring 340 and the end surface of the rim 312 of the opening of the housing body 310 is measured in the above condition of setting the lid member 320. Then, as illustrated in FIG. 9, a washer 420 with a thickness corresponding to the clearance amount is put around the screw hole 312a and is inserted into the clearance, and the screw 410 is passed through the washer 420 and is fastened as described above. The washer 420 is an example of a spacer of the present invention. At this time, the plate spring 340 deflects by an amount corresponding to the clearance amount, and the washer 420 is held between the plate spring 340 and the end surface of the rim 312 of the opening. Thus, the fastening is finished.

The thickness of the washer 420 is made thinner than the measured clearance amount to use a space between the washer 420 and the plate spring 340 as a fastening amount of the screw 410 for deforming the plate spring 340. The thickness of the washer 420 is, for example, approximately 0.1 mm. The fastening amount of the screw 410, that is, the elastic deformation amount of the plate spring 340, is adjusted by changing the thickness of the washer 420, to adjust the load for the pre-load.

(5) Effects of Embodiment

Figure 13A:
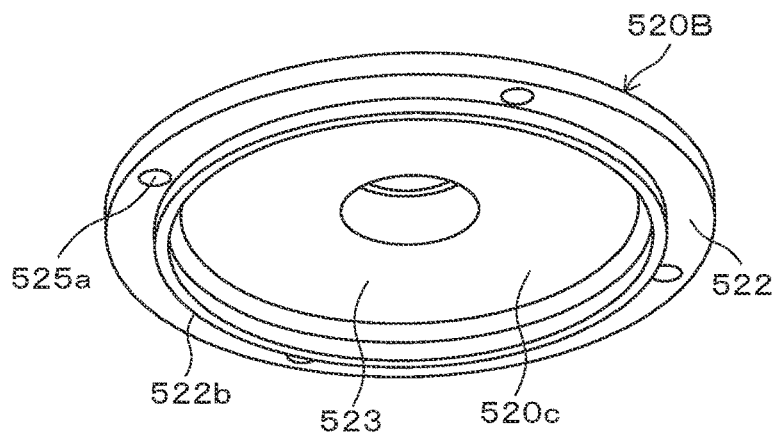
FIGS. 13A and 13B are perspective views showing a lid member in FIG. 12.
Figure 13B:
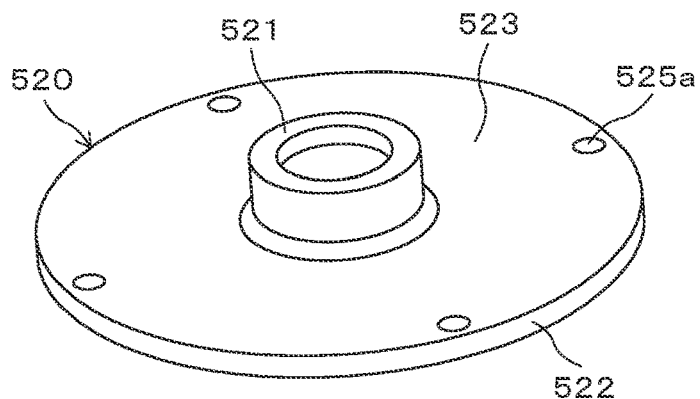
Figure 14:
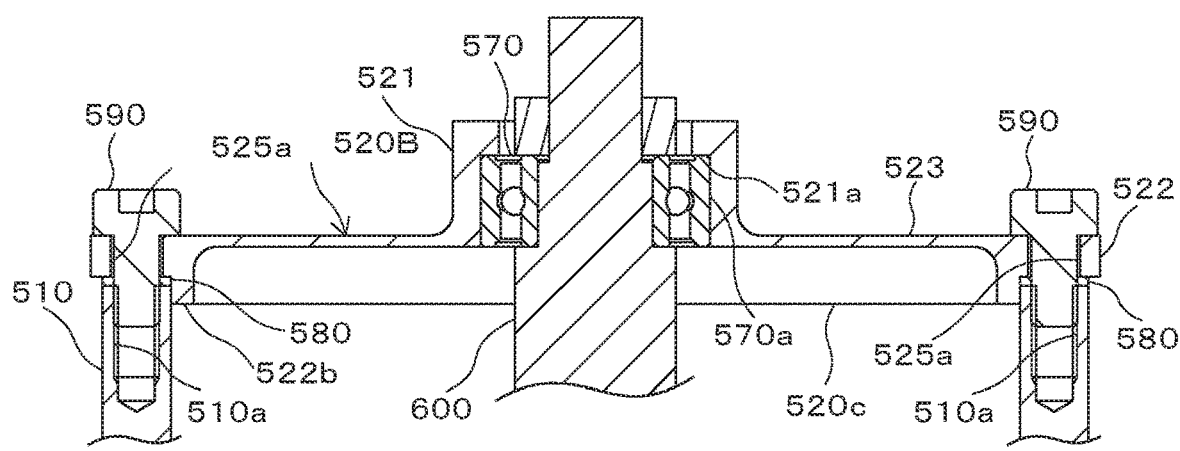
FIG. 14 is a sectional view showing details of a structure for applying a pre-load to a bearing of a scanning part in FIG. 12.

In the above embodiment, the structure that substantially applies the pre-load to the bearing 27 includes the three members: the sleeve 330, the plate spring 340, and the ring 350, which constitute the lid member 320 and are separable. That is, the plate spring 340 that applies the pre-load by elastically deforming is an independent member. For this reason, the elastic deformation of the plate spring 340 is not prone to be restricted by the other two members, which are the sleeve 330 and the ring 350. Thus, compared with an existing integrally formed member such as the lid member 520B illustrated in FIGS. 13A to 14, the structure of this embodiment has a greater elastic deformation amount for applying the pre-load. From another point of view, in a case in which an existing integrally formed member and the plate spring 340 have the same outer diameter, the plate spring 340 has an elastically deforming part with a length in the diameter direction longer than that of the elastically deforming part of the existing integrally formed member, which indicates that the elastic deformation amount of this embodiment is greater than that of the existing one.

The pre-load is applied by using the plate spring 340 that is an independent member providing a relatively great elastic deformation amount. Thus, applying the pre-load by an appropriate load is easy because it only requires preparing a plate spring 340 with an elasticity corresponding to the desired pre-load. Moreover, appropriately selecting one for the plate spring 340 eliminates the need to finely change the thickness of the washer 420. As a result, it is not necessary to prepare a large number of washers having different thicknesses, thereby allowing an easy pre-load control with the washer. Furthermore, the plate spring 340 configured to be an independent member can be made of a general-purpose plate spring. Thus, spring characteristics, yield strength, and other factors of the plate spring 340 are appropriately adjusted corresponding to a desired pre-load, by selecting material, thickness, and other specifications.

The sleeve 330, the plate spring 340, and the ring 350 constituting the lid member 320 are formed into simple shapes. At this time, these members may be individually processed and be produced to shorten the production time more than in a case of producing an existing lid member with a complicated shape, such as the lid member 520B. In this case, also, the plate spring 340 can be made of a general-purpose plate spring. For these reasons, the present invention enables decrease in production cost much greater than heretofore. The pre-load is applied by fastening the screws 410 to elastically deform the plate spring 340, and therefore, the load for the pre-load is finely adjusted.

The pre-load is applied to the outer ring 27a from the engaging part 332 of the sleeve 330 in the condition in which the engaging part 332 contacts almost the entirety of the upper end surface in the entire periphery of the outer ring 27a and directly engaging with the outer ring 27a. Thus, a sufficient force for pressing down the outer ring 27a is obtained uniformly in the peripheral direction. That is, the pre-load is applied uniformly to the entire periphery of the outer ring 27a without generating imbalance, which enables highly accurate pre-load adjustment.

The present invention can be used in a pre-load applying structure for suppressing backlash of a rolling bearing and is suitably used for a bearing that rotatably supports a scanning mirror of a three-dimensional survey device.

What is claimed is:

1. A structure for applying a pre-load to a rolling bearing of a rotational mirror driving unit,
the rotational mirror driving unit including the rolling bearing, a mirror, and a rotational driving part, the rolling bearing having an outer ring and an inner ring to which a first rotating shaft is fixed, the mirror constituting an optical system and being attached to the first rotating shaft, and the rotational driving part configured to rotationally drive the first rotating shaft,
the structure comprising:
an engaging member that engages with the outer ring;
a plate spring that detachably engages with the engaging member and that has a fastening part to be fixed to a fixing member; and
a joining member that detachably joins the engaging member and the plate spring,
wherein in a condition in which the fastening part of the plate spring is fastened to the fixing member by a fastening member, the plate spring elastically deforms, and the elasticity of the plate spring applies a pre-load to the outer ring via the engaging member.

2. The structure for applying the pre-load to the rolling bearing according to claim 1, wherein the fastening part of the plate spring and the fixing member have a spacer therebetween.

3. The structure for applying the pre-load to the rolling bearing according to claim 1, wherein the fastening member includes a screw member that screws with the fixing member to fasten the fastening part to the fixing member.

4. The structure for applying the pre-load to the rolling bearing according to claim 1, further comprising a pressing plate that presses down the plate spring in a condition of being laminated on the plate spring and being fixed to the fixing member by the fastening member.

5. The structure for applying the pre-load to the rolling bearing according to claim 1, wherein the engaging member directly engages with the outer ring by contacting a surface of an entire periphery of the outer ring.

6. A three-dimensional survey device comprising:
a rotational mirror driving unit that includes a rolling bearing, a mirror, and a rotational driving part, the rolling bearing having an outer ring and an inner ring to which a first rotating shaft is fixed, the mirror constituting an optical system and being attached to the first rotating shaft, and the rotational driving part configured to rotationally drive the first rotating shaft;
a unit-rotation driving unit that rotates the rotational mirror driving unit via a second rotating shaft that orthogonally crosses an axis direction of the first rotating shaft;
a light source that also constitutes the optical system and emits distance measuring light to the mirror; and
a distance measuring unit that receives the distance measuring light after the distance measuring light reflected at the mirror is emitted to an object to be measured, is reflected back, and enters the mirror, and the distance measuring unit calculates a distance to the object to be measured on a basis of the received distance measuring light,
wherein the rolling bearing is provided with the structure according to claim 1.

\* \* \* \* \*

UNITED STATES PATENT AND TRADEMARK OFFICE
CERTIFICATE OF CORRECTION

PATENT NO. : 10,753,739 B2  
APPLICATION NO. : 16/100682  
DATED : August 25, 2020  
INVENTOR(S) : Yasuo Terashima et al.

Page 1 of 1

It is certified that error appears in the above-identified patent and that said Letters Patent is hereby corrected as shown below:

In the Specification

Column 5, Line 24, "and emits distance measuring light to the minor" should read --and emits distance measuring light to the mirror--.

Signed and Sealed this  
Fifteenth Day of December, 2020

Andrei Iancu  
*Director of the United States Patent and Trademark Office*